Oct. 15, 1935.  P. ROTHER ET AL  2,017,376
DETERMINATION OF THE PERCENTAGE OF WATER IN
WOOD, TEXTILES AND OTHER SUBSTANCES
Filed June 7, 1933
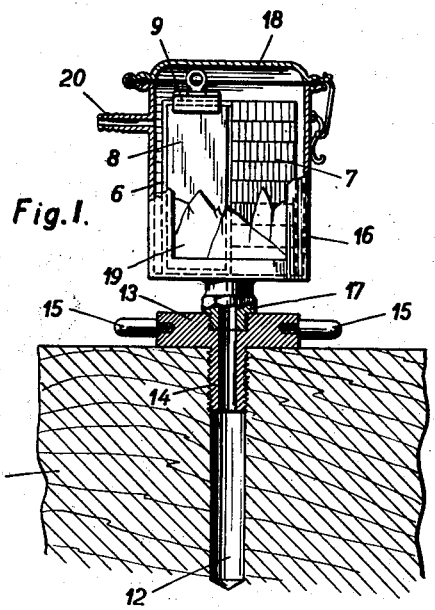
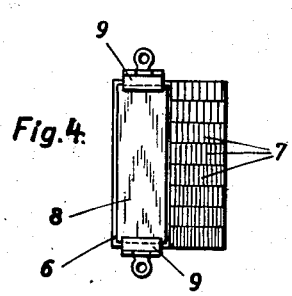
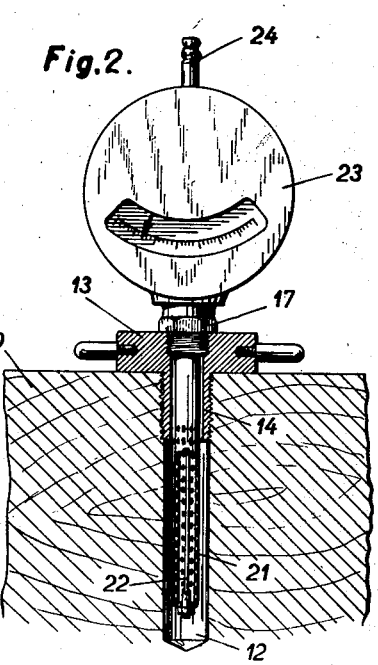
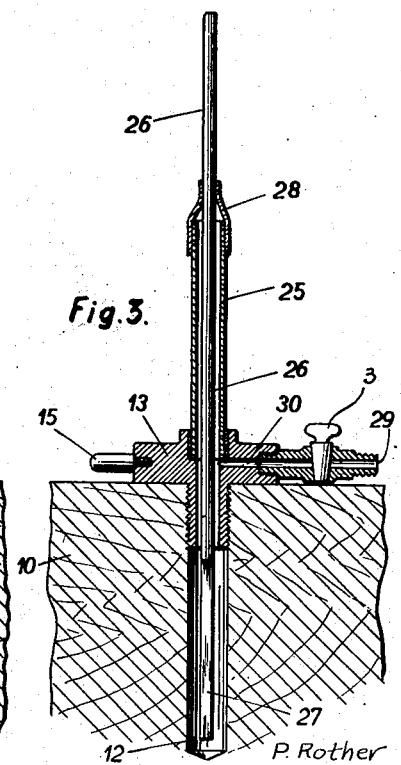
P. Rother
G. Grau
INVENTOR
By: Marks & Clerk
Attys.

Patented Oct. 15, 1935

2,017,376

UNITED STATES PATENT OFFICE 2,017,376

DETERMINATION OF THE PERCENTAGE OF WATER IN WOOD, TEXTILES, AND OTHER SUBSTANCES

Paul Rother and Georg Grau, Chemnitz, Germany

Application June 7, 1933, Serial No. 674,740
In Germany June 13, 1932

2 Claims. (Cl. 73—51)

This invention makes use of the fact that in wood and substances of similar fine colloidal structure, the water held fast by adsorption stands in a definite relationship to the moisture of the surrounding air, and that this relationship applies most accurately in the case of the air which is to be found in the closed cavities in the interior of the substance, that is to say, in the case of wood, intercellular interstices.

The invention therefore utilizes as a measuring means the air enclosed in the internal spaces of the substances, which is in a state of equilibrium with the water content of the substances. The invention consists in drawing this test air out of the internal cavities by suction and causing it to act quickly upon a moisture indicating device in a closed chamber, after expelling the air contained in the latter.

One form of the invention consists in determining the percentage of moisture contained in the test air in a testing vessel by colorimetric means, that is to say, by examining the discoloration which the percentage of moisture in this air occasions in a hygroscopic colour substance, such as a cobalt compound for example, introduced into the testing chamber.

According to one advantageous form of the invention, the measuring of the moisture content of the test air is carried out on the undisintegrated material itself. For this purpose a cavity, for instance a drilled hole, is made in the material to be tested, this hole being made in such a way as to open as many air spaces as possible surrounded by the colloidal substance. To this hole is connected either as small a vessel as possible, which contains the device for indicating the percentage of moisture, and into which the test air is sucked out of the cavity, or else an indicating device is employed of such a shape that it can be introduced into the cavity made in the material like a probe, the indication being read from the outside. This latter constructional form presents the great advantages that clearance spaces are as far as possible avoided, the test air is supplied to the indicating device by the shortest path, and the arrangement prevents the test air from coming into contact with the surfaces of other substances at different temperatures.

Various examples of the construction of apparatus suitable for the carrying out of this method of testing are illustrated in the accompanying drawing, in which Figures 1, 2, and 3 show in sectional elevation three constructional forms of the testing device, and Figure 4 shows on a larger scale the colorimetric indicating device used therewith.

In the constructional forms of the apparatus illustrated in Figures 1, 2, and 3, it is assumed that the mean percentage of moisture in a wooden board 10 is to be determined. For this purpose the board is bored from the side at right angles to the direction of growth of the wood. The hole 12, the length of which is determined according to the breadth of the board, opens a very large number of intercellular interstices, and therefore cuts open almost all the zones of moisture, which exhibit percentages of water varying from the edge of the board towards the centre. Into the drilled hole is screwed in an airtight manner an axially bored connecting piece, upon which a measuring device is mounted. In Figure 1 the connecting piece is marked 13, and its screw-threaded coupling, which engages in the drilled hole 12, is marked 14. Handles 15 facilitate the screwing in. To the connecting piece 13 a measuring vessel 16 is secured by means of a screw-threaded coupling member 17. The measuring vessel is a flat casing, with an aperture, which is adapted to be closed by a cover 18, and through which the indicating device is introduced. The indicating device consists of a carrier 6, to which is clamped by a clamp 9, beside a scale of colours 7, a strip of paper 8 saturated with the hygroscopic discolouring substance. Through an inspection aperture 19 provided in the casing 16 and closed by a transparent window, the indicating device can be read. At the side there is provided on the casing a coupling member 20 for connection to a small air pump of ordinary construction. By a few strokes of the air pump, which is provided with a non-return valve in a known manner, the air originally contained in the measuring vessel is drawn out, so that the test air escaping from the intercellular spaces of the wood flows out and comes into action upon the indicating device.

As suitable discolouring substances, cobalt compounds with other heavy metal salts shading the tint have been found particularly satisfactory, for instance cobalt chloride in mixture with potassium. In the case of such a cobalt compound the colours go from pure blue at a water content of 0 per cent. to pale blue at 5 per cent., bluish red at 10 per cent., pale bluish rose at 15 per cent., rose at 20 per cent. and quite pale rose at 25 per cent. In this manner the percentage of water from wood can be determined in about ten minutes within the limits of reaction of the discolouring hygroscopic substance to an accuracy of about 1 per cent., without weighings and sensitive measuring instruments being required. This method is independent of the kind of wood, and of its structure, and of the colour of the wood.

According to Figure 2, the coupling piece 13 serves for the connection of a hair hygrometer, the perforated tube 21 of which projects like a probe into the passage 12 drilled in the board 10. The test air can therefore reach the hair-line 22 of the hygrometer by the shortest path. On the hygrometer casing 23 is provided a coupling member 24 for an air pump, so that the air originally contained in the casing can be drawn out.

Figure 3 shows a constructional example in which a glass tube 25 is inserted in the axial bore of the coupling member 13 in an airtight manner, by cementing it in for instance. Through this glass tube is introduced a probing rod 26, of vulcanite for example, which carries at the lower end a stiffened testing strip 27, which corresponds to the testing strip 8 of the indicating device of the constructional example illustrated in Figure 4. The upper end of the glass tube 25 is sealed by an india-rubber cap 28. The coupling member 29 for the air pump is provided on the coupling piece 13, which for this purpose is provided with a transverse bore 30 opening into its axial bore. For the purpose of effecting a measurement the testing strip 27 is pushed into the drilled hole 12 by means of the probing rod, some air is drawn out with the air pump, and the apparatus is then left to itself for a few minutes. The testing strip is then drawn back into the glass tube 25 with the probing bar and is compared with the scale of colours. The air pump may remain with the coupling member 29 during the testing, so that its non-return valve closes the testing chamber in an air-tight manner after the air is withdrawn. Alternatively a cock 3 may be provided for the purpose of closing the testing chamber, as shown in Figure 3.

What we claim is:—

1. Apparatus for determining the percentage of water in wood, textiles and other substances, comprising a testing chamber formed at least in part of a transparent material, a moisture indicating device, the testing chamber being adapted to contain the moisture indicating device, means for placing the interior of the testing chamber in communication with a cavity formed in the material to be tested, means for withdrawing air from the testing chamber, and means for closing the testing chamber in an air-tight manner, while leaving it in open communication with the cavity in the material, when such air is withdrawn.

2. Apparatus for determining the percentage of water in wood, textiles and other substances, comprising a testing chamber consisting of a tube formed at least in part of a transparent material, a tubular coupling member by which the testing chamber can be placed in communication with a cavity formed in the material to be tested, a probing rod, a hygrosocopic substance capable of indicating different degrees of moisture by changes of colour mounted on the forward end of the probing rod, the probing rod being longitudinally displaceable in the testing chamber and tubular coupling member so that the hygroscopic substance can be advanced into the cavity in the material and subsequently withdrawn into the transparent part of the testing chamber for inspection, means for withdrawing air from the testing chamber, and means for closing the testing chamber in an air-tight manner when such air is withdrawn.

PAUL ROTHER.
GEORG GRAU.